(12) United States Patent
Stojanovski et al.

(10) Patent No.: US 10,448,419 B2
(45) Date of Patent: Oct. 15, 2019

(54) SYSTEMS AND METHODS FOR EFFICIENT TRAFFIC OFFLOAD WITHOUT SERVICE DISRUPTION

(71) Applicant: INTEL IP CORPORATION, Santa Clara, CA (US)

(72) Inventors: Alexandre Saso Stojanovski, Paris (FR); Muthaiah Venkatachalam, Beaverton, OR (US); Danny Moses, Reut (IL)

(73) Assignee: INTEL IP CORPORATION, Santa Clara, CA (US)

( * ) Notice: Subject to any disclaimer, the term of this patent is extended or adjusted under 35 U.S.C. 154(b) by 1 day.

(21) Appl. No.: 15/697,662

(22) Filed: Sep. 7, 2017

(65) Prior Publication Data

US 2018/0110064 A1    Apr. 19, 2018

Related U.S. Application Data

(63) Continuation of application No. 15/060,390, filed on Mar. 3, 2016, now Pat. No. 9,788,201, which is a
(Continued)

(51) Int. Cl.
*H04W 72/12* (2009.01)
*H04W 16/32* (2009.01)
(Continued)

(52) U.S. Cl.
CPC ...... *H04W 72/1263* (2013.01); *H04B 7/0417* (2013.01); *H04B 7/0456* (2013.01);
(Continued)

(58) Field of Classification Search
CPC . H04W 72/1263; H04W 76/28; H04W 76/14; H04W 76/11; H04W 76/27;
(Continued)

(56) References Cited

U.S. PATENT DOCUMENTS

2010/0142367 A1* 6/2010 Zhang ................... H04W 36/02
370/216
2011/0007748 A1 1/2011 Yin et al.
(Continued)

FOREIGN PATENT DOCUMENTS

EP    1458148 A1    9/2004
EP    2442610 A1    4/2012
(Continued)

OTHER PUBLICATIONS

U.S. Appl. No. 14/128,217, Notice of Allowance, dated Dec. 14, 2015, 17 pages.
(Continued)

*Primary Examiner* — Sai Ming Chan
(74) *Attorney, Agent, or Firm* — Stoel Rives LLP

(57) ABSTRACT

Methods, systems, and devices for offloading traffic flows without service disruption are disclosed herein. User equipment (UE) is configured to receive an indication that a current packet data network (PDN) connection can be optimized. The current PDN connection is established over a first PDN gateway (PGW). The UE requests connection over a new PDN connection to a same type of service as the current PDN connection without releasing the connection over the first PGW. The UE routes new traffic flows over a second PGW corresponding to the new PDN connection and routes old traffic flows over the first PGW.

21 Claims, 11 Drawing Sheets

Related U.S. Application Data continuation of application No. 14/128,217, filed as application No. PCT/US2013/061946 on Sep. 26, 2013, now Pat. No. 9,313,803.

(60) Provisional application No. 61/753,914, filed on Jan. 17, 2013.

(51) Int. Cl.

| | | |
|---|---|---|
| H04W 56/00 | (2009.01) | |
| H04L 5/22 | (2006.01) | |
| H04J 3/00 | (2006.01) | |
| H04W 28/02 | (2009.01) | |
| H04W 76/27 | (2018.01) | |
| H04W 76/11 | (2018.01) | |
| H04W 52/02 | (2009.01) | |
| H04W 12/04 | (2009.01) | |
| H04W 84/12 | (2009.01) | |
| H04W 88/06 | (2009.01) | |
| H04L 5/00 | (2006.01) | |
| H04W 48/10 | (2009.01) | |
| H04W 76/28 | (2018.01) | |
| H04W 76/14 | (2018.01) | |
| H04B 7/0417 | (2017.01) | |
| H04B 7/0456 | (2017.01) | |
| H04L 1/18 | (2006.01) | |
| H04L 5/14 | (2006.01) | |
| H04L 9/14 | (2006.01) | |
| H04L 12/26 | (2006.01) | |
| H04L 29/06 | (2006.01) | |
| H04L 29/08 | (2006.01) | |
| H04W 4/06 | (2009.01) | |
| H04W 8/00 | (2009.01) | |
| H04W 36/22 | (2009.01) | |
| H04W 48/08 | (2009.01) | |
| H04W 48/20 | (2009.01) | |
| H04W 68/02 | (2009.01) | |
| H04W 72/00 | (2009.01) | |
| H04W 72/02 | (2009.01) | |
| H04W 72/04 | (2009.01) | |
| H04W 74/00 | (2009.01) | |
| H04W 24/02 | (2009.01) | |
| H04W 24/10 | (2009.01) | |
| H04W 48/16 | (2009.01) | |
| H04W 12/02 | (2009.01) | |
| H04W 36/00 | (2009.01) | |

(52) U.S. Cl.
CPC .............. *H04J 3/00* (2013.01); *H04L 1/1812* (2013.01); *H04L 1/1887* (2013.01); *H04L 5/0051* (2013.01); *H04L 5/0055* (2013.01); *H04L 5/0057* (2013.01); *H04L 5/0062* (2013.01); *H04L 5/0092* (2013.01); *H04L 5/0096* (2013.01); *H04L 5/14* (2013.01); *H04L 5/1469* (2013.01); *H04L 5/22* (2013.01); *H04L 9/14* (2013.01); *H04L 43/08* (2013.01); *H04L 63/0428* (2013.01); *H04L 63/30* (2013.01); *H04L 65/1006* (2013.01); *H04L 65/4076* (2013.01); *H04L 65/602* (2013.01); *H04L 65/608* (2013.01); *H04L 65/80* (2013.01); *H04L 67/02* (2013.01); *H04W 4/06* (2013.01); *H04W 8/005* (2013.01); *H04W 12/02* (2013.01); *H04W 12/04* (2013.01); *H04W 16/32* (2013.01); *H04W 24/02* (2013.01); *H04W 24/10* (2013.01); *H04W 28/0231* (2013.01); *H04W 36/0066* (2013.01); *H04W 36/0069* (2018.08); *H04W 36/22* (2013.01); *H04W 48/08* (2013.01); *H04W 48/10* (2013.01); *H04W 48/16* (2013.01); *H04W 48/20* (2013.01); *H04W 52/0251* (2013.01); *H04W 56/001* (2013.01); *H04W 68/02* (2013.01); *H04W 72/00* (2013.01); *H04W 72/02* (2013.01); *H04W 72/042* (2013.01); *H04W 72/046* (2013.01); *H04W 72/0406* (2013.01); *H04W 72/0413* (2013.01); *H04W 72/0446* (2013.01); *H04W 72/12* (2013.01); *H04W 72/1205* (2013.01); *H04W 72/1278* (2013.01); *H04W 74/00* (2013.01); *H04W 76/11* (2018.02); *H04W 76/14* (2018.02); *H04W 76/27* (2018.02); *H04W 76/28* (2018.02); *H04W 84/12* (2013.01); *H04W 88/06* (2013.01); *H04L 5/0035* (2013.01); *H04L 5/0094* (2013.01); *H04L 2209/24* (2013.01); *H04L 2209/80* (2013.01); *Y02B 70/32* (2013.01); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/21* (2018.01); *Y02D 70/22* (2018.01); *Y02D 70/23* (2018.01); *Y02D 70/24* (2018.01); *Y02D 70/25* (2018.01)

(58) Field of Classification Search
CPC .............. H04W 36/0069; H04L 1/1812; H04L 1/1887; H04L 5/0051; H04L 5/0055
USPC ......................................................... 370/230
See application file for complete search history.

(56) References Cited

U.S. PATENT DOCUMENTS

| | | | |
|---|---|---|---|
| 2011/0170517 A1 | 7/2011 | Bakker et al. | |
| 2012/0063300 A1 | 3/2012 | Sahin et al. | |
| 2012/0076121 A1 | 3/2012 | Choi et al. | |
| 2012/0189016 A1 | 7/2012 | Bakker et al. | |
| 2012/0224536 A1 | 9/2012 | Hahn et al. | |
| 2012/0307799 A1 | 12/2012 | Taleb et al. | |
| 2013/0231115 A1* | 9/2013 | Lin | H04W 36/0083 455/436 |
| 2014/0051443 A1* | 2/2014 | Diachina | H04W 36/0022 455/436 |
| 2014/0341109 A1 | 11/2014 | Cartmell et al. | |
| 2017/0245318 A1* | 8/2017 | Rayavarapu | H04W 68/005 |

FOREIGN PATENT DOCUMENTS

| | | |
|---|---|---|
| KR | 101148036 B1 | 6/2012 |
| KR | 1020120059751 A | 6/2012 |
| WO | 2011098249 A2 | 8/2011 |
| WO | 2013004793 A1 | 1/2013 |

OTHER PUBLICATIONS

U.S. Appl. No. 14/128,217, Non-Final Office Action, dated Jul. 1, 2015, 24 pages.
U.S. Appl. No. 15/060,390, Non-Final Office Action, dated Dec. 16, 2016, 22 pages.
U.S. Appl. No. 15/060,390, Notice of Allowance, dated Jun. 21, 2017, 9 pages.

(56) References Cited

OTHER PUBLICATIONS

PCT/US2013/061946, International Search Report and Written Opinion, dated Feb. 19, 2014, 13 pages.

* cited by examiner

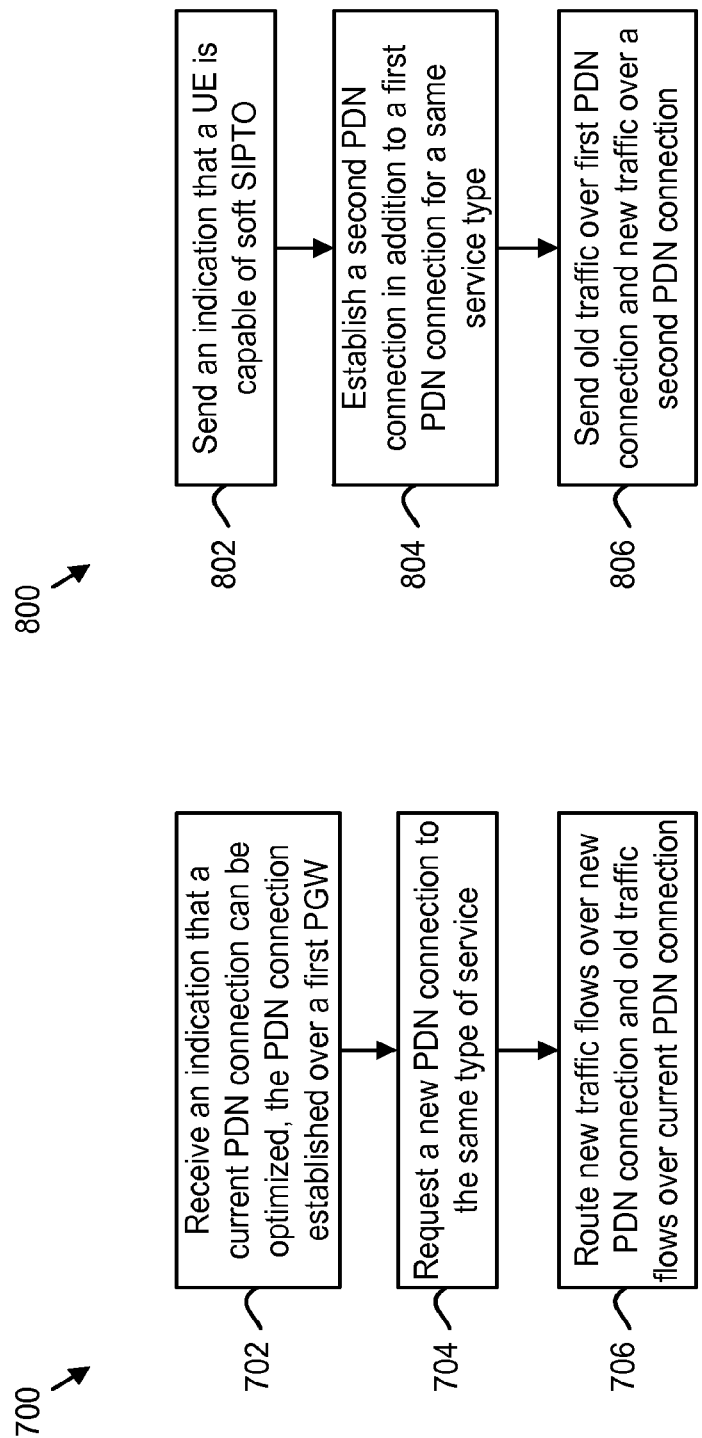

SYSTEMS AND METHODS FOR EFFICIENT TRAFFIC OFFLOAD WITHOUT SERVICE DISRUPTION

RELATED APPLICATIONS

This application is a continuation of U.S. patent application Ser. No. 15/060,390, filed Mar. 3, 2016, which is a continuation of U.S. patent application Ser. No. 14/128,217, filed Dec. 20, 2013, which is the National Stage of International Application No. PCT/US13/61946, filed Sep. 26, 2013, which claims the benefit of U.S. Provisional Application No. 61/753,914, filed Jan. 17, 2013. Each one of the aforementioned applications is hereby incorporated by reference herein in its entirety.

TECHNICAL FIELD

The present disclosure relates to traffic offloading and more particularly relates to wireless traffic offload without service disruption.

BRIEF DESCRIPTION OF THE DRAWINGS

FIG. 7 is a schematic flow chart diagram illustrating a method for offloading of traffic flows consistent with embodiments disclosed herein.

FIG. 8 is a schematic flow chart diagram illustrating another method for offloading of traffic flows consistent with embodiments disclosed herein.

DETAILED DESCRIPTION OF PREFERRED EMBODIMENTS

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as WiMAX (Worldwide Interoperability for Microwave Access); and the IEEE 802.11 standard, which is commonly known to industry groups as WiFi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

Common goals in many wireless networks include mobility, continuity of service, and/or high data rates. In cellular wireless networks, mobility of a wireless mobile device often requires coverage of large areas which in turn often requires the use of multiple base stations. As the wireless mobile device moves, it may be necessary to hand off the communication services for the wireless mobile device to a different base station. Mobility also often requires selection of new paths through network infrastructure to provide optimal service for the wireless mobile device and/or efficiently use network resources.

Figure 1A:
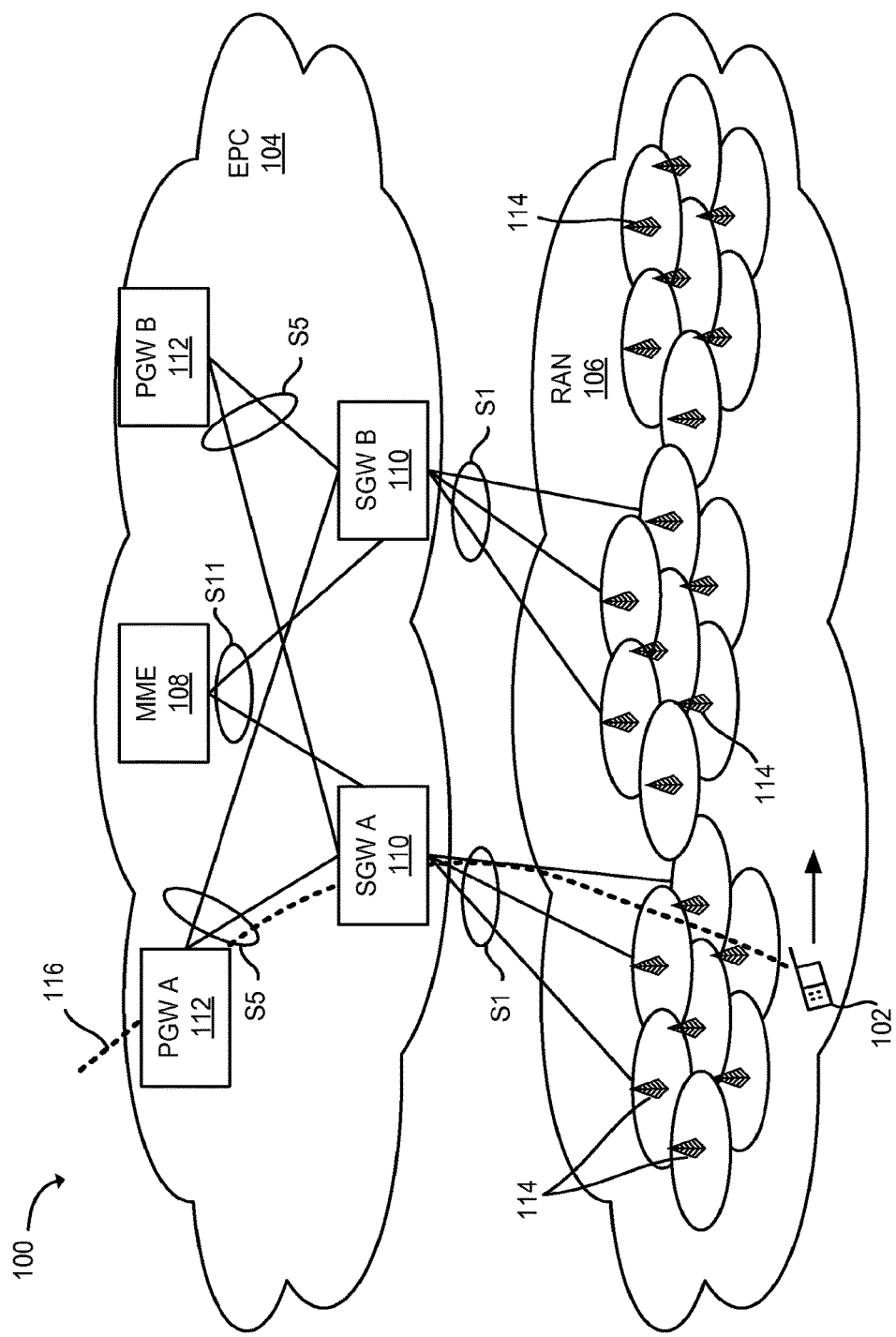
FIGS. 1A and 1B are a schematic diagrams illustrating a communication system and example packet data network (PDN) communication paths.
Figure 1B:
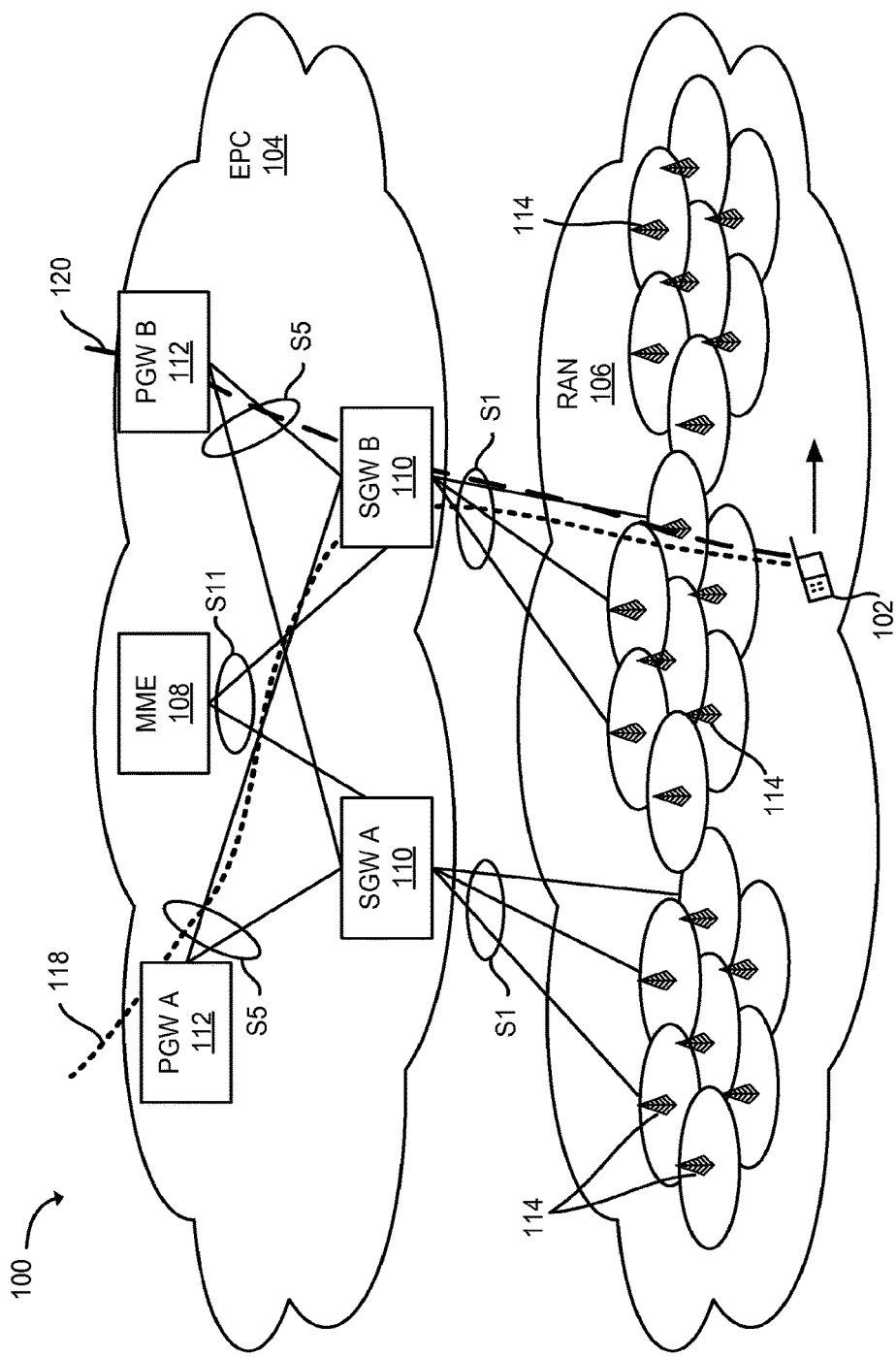

Turning now to FIGS. 1A and 1B, traffic offloading as set forth with respect to selected internet protocol (IP) traffic offload (SIPTO) described in 3GPP TS 23.401 will be discussed. FIG. 1A illustrates a communication system 100 for delivering wireless communication services to a UE 102. The communication system 100 includes an evolved packet core (EPC) 104 and a RAN 106. The EPC 104 includes an MME 108 which controls serving gateway (SGW) A 110 and SGW B 110. Each of the SGWs 110 are connected to two geographically distant PDN gateways (PGW) which include PGW A 112 and PGW B 112. The RAN 106 includes a plurality of eNBs 114 which provide radio coverage to the UE 102. The PGWs include communication nodes which serve as access points to a PDN. In FIG. 1A, the UE 102 is shown at a first location within coverage of the RAN 106. The UE 102 connects to an eNB 114 and requests a PDN connection to a specific access point name (APN). The MME 108 selects geographically close PGW A 112, in order to optimize the backhaul transport (S1 and S5 tunnels) via the EPC 104 network. The current PDN connection path 116 is illustrated by a dotted line.

In FIG. 1B, the UE 102 has moved to a new location. As the UE 102 moves away from its initial location, it eventually leaves the area (e.g. the group of eNBs 114) served by SGW A 110, which leads to an SGW relocation. During the SGW relocation, the MME 108 assigns a new SGW 110, specifically SGW B 110. The traffic flows for the UE 102 are still tunneled to the PGW A 112 as illustrated by PDN connection path 118. By tunneling the flows through the original PGW 112, continuity of service can be maintained because there is no change in the IP address used by the UE 102.

At some point the MME 108 may decide that the PDN connection path 118 needs to be streamlined. For example, the traffic in FIG. 1B is being inefficiently backhauled over PDN connection path 118 to PGW A 112, which is geographically distant from the UE 102 and/or SGW B 110. After determining that the connection needs to be streamlined, the MME 108 may initiate deactivation of the PDN connection path 118 and includes a cause value indicating that PDN reactivation is requested. Once the PDN connection path 118 is released, the UE 102 requests a new PDN connection to the same APN. During the PDN connection establishment, the MME 108 selects a geographically closer PGW 112, for example PGW B 112, for a new PDN connection. The new PDN connection path 120 is illustrated.

The PDN connection reactivation, as discussed above, implies the release of the IP address hosted on PGW A 112, followed by assignment of a new IP address hosted on PGW B 112. The PDN deactivation may be initiated by the MME 108 at any time. For example, the MME 108 does not take into account what type of traffic flows are currently involved over the old PDN connection path 118 but simply releases it when the connection can be optimized. This unpredictable deactivation can cause disruption to services that have active traffic flows when the PDN deactivation occurs. Given that in the traditional EPC 104 architecture in 3GPP the PGWs 112 reside generally deep within the EPC 104 network, the PDN deactivation procedure is generally used infrequently, thus minimizing the occurrences of service disruption. Even with the infrequent deactivation, continuity of service can be severely affected when SIPTO is initiated.

Figure 2:
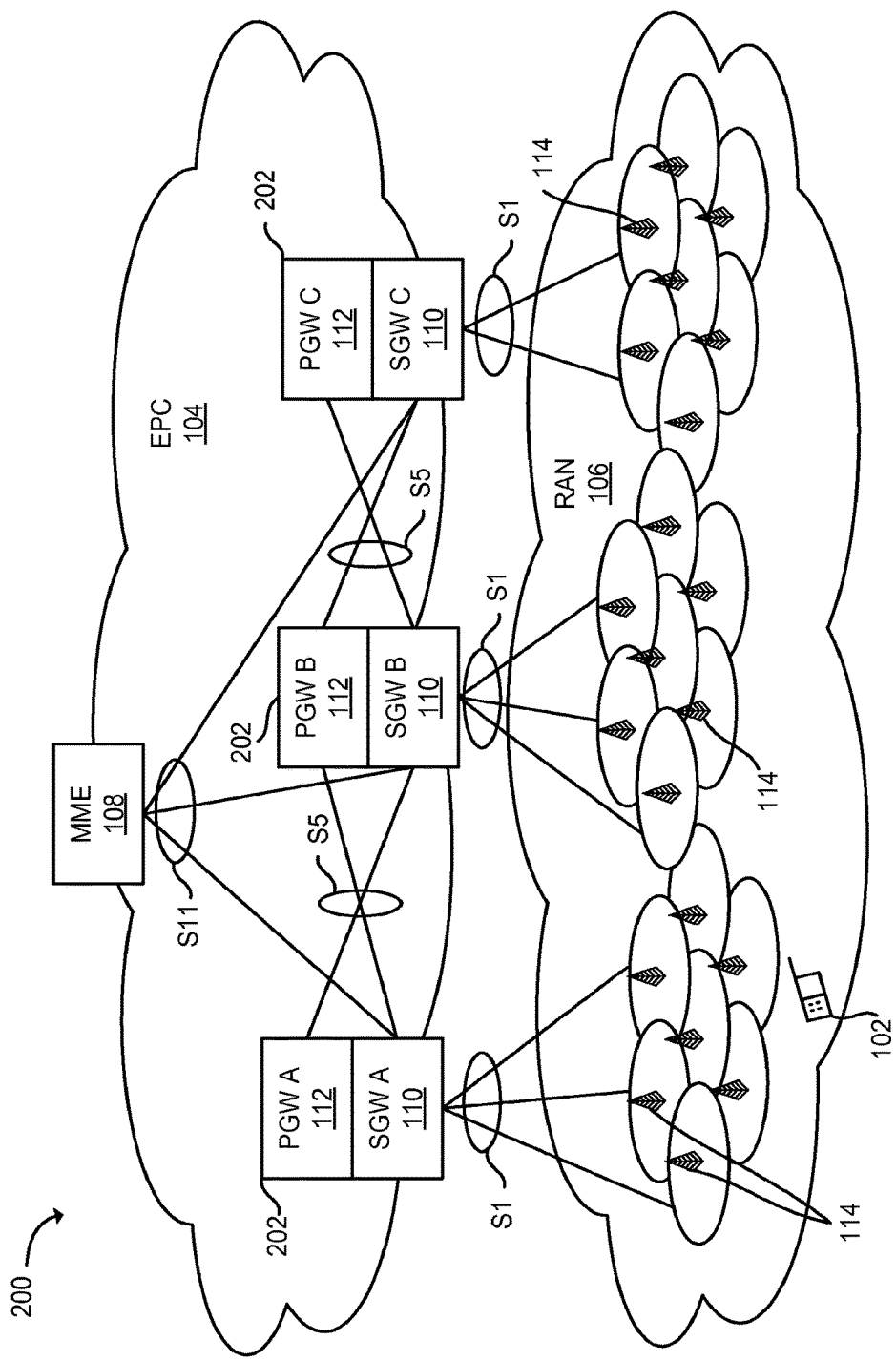
FIG. 2 is a schematic diagram illustrating a communication system with a flat architecture consistent with embodiments disclosed herein.

Furthermore, starting with Rel-12 specifications, 3GPP has defined SIPTO enhancements known as "SIPTO at the Local Network" (SIPTO@LN) in which the PGW 112 (which may also be referred to as the Local Gateway or LGW) resides very close to the network edge. For example, the PGW 112 may be collocated with an SGW 110 or, in the extreme case, can even be collocated with an eNB 114. An example of such a "flat" architecture is depicted in FIG. 2 that illustrates a system 200 with combined SGW/PGW nodes 202. The eNBs 114 are logically grouped into small clusters corresponding to each SGP/PGW node 202. In one embodiment, the IP breakout point (PGW 112) can be collocated with an eNB 114.

In the flat architecture of FIG. 2, when the UE 102 moves from one cluster to another, the SGW is relocated. With SIPTO operating as explained above, the original PGW 112 can be temporarily preserved (by using the inter cluster S5 interface) until the SIPTO feature is invoked by the MME 108. Invocation of the SIPTO feature will lead to a service disruption. Given the small cluster size of FIG. 2, with the PGW 112 at the SGW nodes 202, the SIPTO feature will be invoked more frequently than in a traditional architecture (such as those illustrated in FIGS. 1A and 1B). The more frequent use of SIPTO will also increase the occurrences for potential service disruption and may result in severely reduced service continuity, particularly with long-lived traffic flows, such as file downloads or streaming media.

With regard to the foregoing, Applicants have developed systems and methods for traffic offloads to reduce service disruptions. While applicable to flat architectures, as discussed above, the present disclosure is also applicable to more traditional architectures and may improve continuity of services in those networks as well.

In one embodiment, a UE 102 receives an indication that a current PDN connection is not optimal. For example, the MME 108 may determine that the current connection is routed over a geographically distant PGW and that a more proximal PGW is available to improve the backhaul connection. The PDN connection may be established over a first PGW 112. The UE 102 requests a second PDN connection for the same APN and the MME 108 takes care to establish the second PDN connection over a second PGW 112 to the same type of service as the current PDN connection without releasing the connection over the first PGW 112. The UE 102 routes new traffic flows over the second PGW 112 and routes old traffic flows over the first PGW 112. As used herein, the term soft SIPTO refers to the improved methods for traffic offload, or improved version of SIPTO. In one embodiment, soft SIPTO is given to mean the routing of old traffic flows over a first PDN connection and routing new traffic flows over a second PDN connection. In one embodiment, soft SIPTO includes underlying coordination between the UE 102 and network.

Soft SIPTO may include a method for traffic offloads without service disruption which includes an MME 108 indicating to a UE 102 that there is a possibility for optimizing an established PDN connection. The MME 108 may indicate the possibility in response to an SGW relocation after the UE 102 has been handed over to a new cluster corresponding to a new SGW 110. The MME 108 may indicate this by using non-access stratum (NAS) signaling. Upon reception of this indication from the MME 108, the UE 102 triggers a second PDN connection establishment for the same communication service type. For example, the UE 102 may request a second PDN connection to the same APN without releasing the old one and the MME 108 establishes the "new" PDN connection using a geographically closer PGW 112. A new IP address hosted on the new PGW 112 is assigned to UE 102 during the process. After establishment of the new PDN connection, the UE 102 routes all new traffic flows via the new PDN connection. However, the UE 102 keeps the old PDN connection until all flows from the old PDN connection have either died away or have been moved to the new PDN connection (e.g. using session initiation protocol (SIP) mobility). When there are no more active flows, the UE 102 may release the "old" PDN connection.

In one embodiment, the above method requires specific UE support and may not be applicable to legacy UEs. For this reason, the UE 102 may need to indicate the soft SIPTO support capability when attaching to the network so that the MME 108 knows whether it may invoke the soft SIPTO feature for a specific UE 102.

The above proposed methods, systems, and devices allow "flat" architecture deployments where the IP breakout point (i.e., the PGW 112) is close to the radio edge, similar to FIG. 2. In order to deal with undesirable consequences of such deployment (i.e. increased frequency of potential service disruption), the network assists the UEs 102, allowing them to cope with frequent changes of IP address smoothly (i.e., without any service disruption).

Although the present disclosure discusses mobile communication and offloading in the context of 3GPP networks and mobile stations, one of skill in the art will recognize that the present disclosure applies to all wireless communication networks with their respective mobile stations, base station, and network infrastructure.

Figures 3, 4:
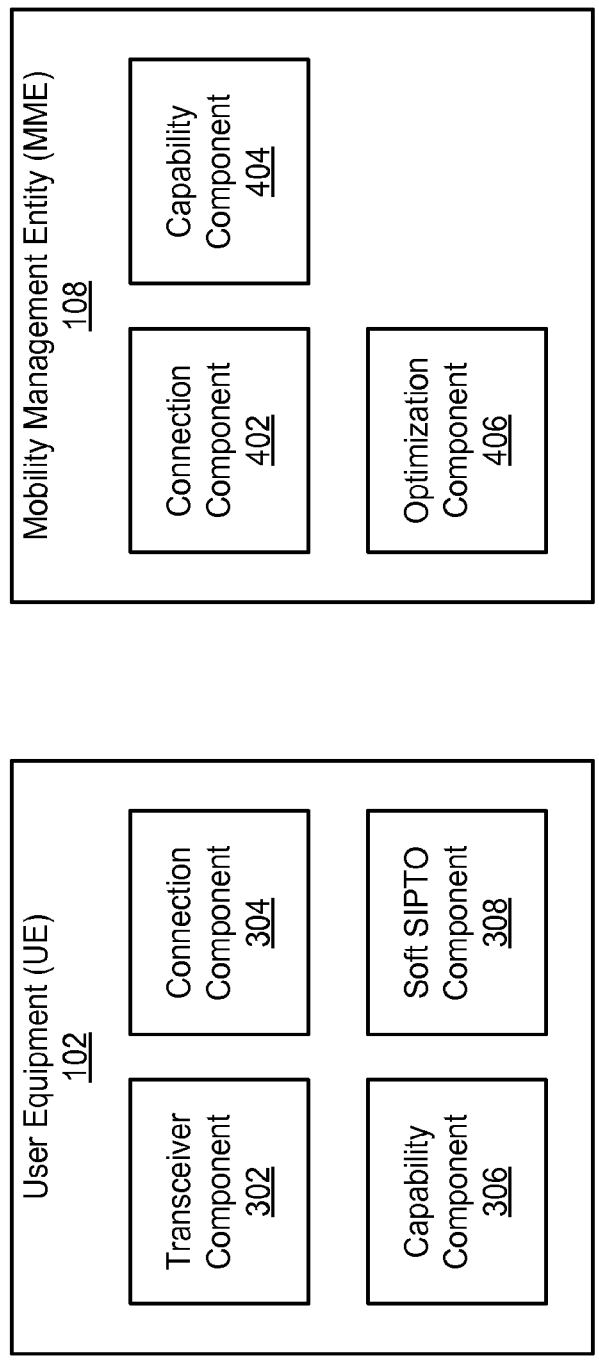
FIG. 3 is a schematic block diagram illustrating user equipment (UE) for efficient offloading without service disruption consistent with embodiments disclosed herein.
FIG. 4 is a schematic block diagram illustrating a mobility management entity (MME) for efficient offloading without service disruption consistent with embodiments disclosed herein.

FIG. 3 illustrates a block diagram of a UE 102 for traffic offloading without service disruptions. The UE 102 includes a transceiver component 302, a connection component 304, a capability component 306, and a soft SIPTO component 308. The UE 102 may include any type of mobile computing or communication device. For example, the UE 102 may include a mobile phone such as a smart phone, a laptop computer, tablet computer, Ultrabook computer, or the like.

The transceiver component 302 is configured to communicate with a communication system, such as through an eNB 114 of the RAN 106 of FIG. 2. The transceiver component 302 may send and receive messages wirelessly using any communication protocol known in the art. In one embodiment, the transceiver comprises processing circuitry and an antenna for wirelessly sending and receiving messages.

The connection component 304 establishes and releases a connection with a communication system 100. In one embodiment the connection component 304 requests a connection to a PDN. The connection component 304 may request a connection to a PDN by specifying an APN corresponding to a service that the UE 102 wishes to use. For example, the connection component 304 may send a message using the transceiver component 302 to request a connection to an Internet service, an IP multimedia subsystem (IMS), or other communication service. An MME 108 or other network infrastructure component may then allow the UE 102 to connect to the service. For example, an MME 108 may cause the UE 102 to connect to the service using a PDN connection over a specific PGW 112. The MME 108 may select a specific PGW 112 that efficiently uses network resources of the EPC 104. For example, the UE 102 may be connected to a PGW 112 and/or SGW 110 that are geographically close to the UE 102.

The connection component 304 may also release a connection over a specific PDN connection or service. For example, the connection component 304 may release a PDN connection corresponding to a specific service when that service is no longer needed. Similarly, the connection component 304 may release an old PDN connection after or prior to establishment of a new PDN connection.

In one embodiment, the connection component 304 allows the UE 102 to maintain a first PDN connection while establishing a second PDN connection. For example, the connection component 304 may, as instructed by the soft SIPTO component 308 and/or an MME 108, establish a new PDN connection to a same service type as an old PDN connection while also maintaining the old PDN connection. For example, the connection component 304 may request connection over a second PGW 112 to a same type of service as the current PDN connection without releasing the connection over the first PGW 112. Because the IP address for a UE 102 or a particular service may be hosted at the PGW 112, the UE 102 may have two corresponding IP addresses for the same service. For example, the UE 102 may be assigned a first IP address on the first PGW 112 and assigned a second IP address on the second PGW 112. The connection component 304 may support the usage of two different IP addresses for the same service type.

In one embodiment, when requesting connection to the same type of service the connection component 304 requests the PDN connection using the APN used to establish the first PDN connection. For example, if the connection component 304 requests using an "apn_internet" APN for the first PDN connection the connection component 304 would also use the same "apn_internet" APN for the new PDN connection.

In another embodiment, when requesting connection to the same type of service the connection component 304 requests the PDN connection using a different APN that corresponds to the same type of service. For example, if the connection component 304 requests using an "apn_internet" APN for the first PDN connection the connection component 304 would use a different APN for the new PDN connection, but the different APN would correspond to the same Internet, IMS, or other service. In one embodiment, the connection component 304 may use a slightly modified version of the same APN. For example, if the connection component 304 requests using an "apn_internet" APN for the first PDN connection the connection component 304 would use the "apn_internet_bis" APN for the new PDN connection. The connection component 304 may switch between the two (or more) APNs as the UE 102 travels through a RAN 106.

The connection component 304 may also release a PDN connection. For example, if a service is no longer needed, the connection component 304 may release a PDN connection corresponding to that service. When the UE 102 is connected to multiple PDN connections that correspond to the same service, the connection component 304 may release a PDN connection that no longer has corresponding IP flows. For example, the UE 102 may have an old PDN connection where old IP flows are directed and a new PDN connection where new IP flows are directed. If all the old IP flows expire, the connection component 304 may release the old PDN connection. The expiration of the old traffic flows may include a traffic flow ending due to the end of a file download, the end of a music stream, the end of a video stream, and/or the transfer of old traffic flows to a new PDN connection.

In one embodiment, old traffic flows may be transferred by the UE 102 from the old PDN (such as over a first PGW 112) to a new PDN (such as over a second PGW 112). Transfers of IP flows may be performed using various protocols and methods. For example, IMS allows for transfer of live IP flows at the application level from one IP address to another without service disruption. In one embodiment, transfer of the old traffic flows comprises transferring the old traffic flows using SIP mobility. Generally, transfers of IP flows using SIP mobility and/or IMS require a delay to set up the transfer and/or perform any required messaging. Because soft SIPTO allows for a delay in maintaining a less optimal PDN connection, IMS and SIP mobility may have enough time to perform methods for transferring of the IP flows. This can lead to improved service continuity while still allowing for optimization of a backhaul connection.

The capability component 306 provides an indication that the UE 102 is capable of soft SIPTO. Generally, a UE 102 and/or a network component must support soft SIPTO in order to efficiently transfer IP flows without service disruption. Thus, the UE 102 may be required to indicate to an MME 108 or other network infrastructure component whether the UE 102 is capable of soft SIPTO. The UE 102 may provide the indication that the UE 102 is capable of soft SIPTO during connection to the system 100 and/or during establishment of a PDN connection of a PGW 112. The UE 102 may indicate its support for soft SIPTO in any manner that indicates the UE 102 supports maintaining a plurality of PDN connections for a same communication service type. The indication that the UE 102 supports soft SIPTO may then allow an MME 108 or other network infrastructure to enable soft SIPTO services for the UE 102.

The soft SIPTO component 308 routes old traffic flows over an old PDN connection and routes new traffic flows over a new PDN connection. The old and new traffic flows may correspond to the same service type. The old traffic flows may include traffic flows that are older than the new PDN connection and the new traffic flows may include traffic flows that are newer or were begun at the same time as the new PDN connection. For example, the old PDN connection may include a connection over a first PGW 112 that is geographically proximal to a first location of the UE 102 while the new PDN connection may include a connection over a second PGW 112 that is geographically proximal to a second location of the UE 102. The connection over the second PGW 112 may have been established in response to the movement of the UE 102 to the second location but the connection over the first PGW 112 may have been maintained for already existing IP flows. Keeping old traffic flows on the old PDN connection may allow for continuity of service as to those IP flows until they expire or can be moved to the new PDN connection. Placing new traffic flows on the new PDN connection may allow for optimization of the network and improve speed and throughput for the UE 102.

In one embodiment, the soft SIPTO component 308 receives an indication that a current PDN connection can be optimized. For example, the MME 108 or other network infrastructure component may notify the UE 102 that the PDN connection could be optimized to improve network usage. In one embodiment, the indication includes an NAS message that indicates that the current PDN connection is less than optimal. The soft SIPTO component 308 may notify the connection component 304 so that the connection component 304 can request and establish a new PDN connection. The soft SIPTO component 308 may also notify the connection component 304 if all the old traffic flows have been transferred or expired so that the connection component 304 may release an old PDN connection.

FIG. 4 illustrates a block diagram of an MME 108 for traffic offloading without service disruption. The MME 108 manages SGWs 110 to provide communication services to one or more UE 102. The MME 108 includes a connection component 402, a capability component 404, and an optimization component 406. In one embodiment, the MME 108 may be located within a communication system 100 that includes PGWs 112 which are located proximally to a network edge. For example, the PGWs 112 may be co-located with corresponding SGWs 110 or eNBs 114. Although the below functionality is discussed specifically in relation to an MME 108 and 3GPP infrastructure, one of skill in the art will recognize that other types of networks may also implement the same or similar functionality.

The capability component 404 determines a capability of a UE 102 with respect to soft SIPTO. For example, the capability component 404 may determine that a UE 102 is capable of soft SIPTO based on a message received from the UE 102 and/or via another network infrastructure component. In one embodiment, the capability component 404 receives an indication that the UE 102 is capable of maintaining two PDN connections for the same service type.

The connection component 402 may manage a connection of the UE 102 by selecting PGW 112 through which a PDN connection for the UE 102 should be established. For example, the connection component 402 may select a PGW 112 that is geographically proximate to the UE 102 and/or SGW 110 in order to more efficiently handle data for the UE 102. In one embodiment, the connection component 402 may allow the UE 102 to establish multiple PDN connections to the same service type, or same APN. For example, the connection component 402 may allow the UE 102 to establish a new PDN connection for new traffic flows on a new PGW 112 while maintaining the current PDN connection for old traffic flows with the old PGW 112.

The optimization component 406 determines whether a current PDN connection can be optimized. For example, the optimization component 406 may compare a location of the UE 102 to the locations of one or more PGWs 112. In one embodiment, a PDN connection may include a connection over a PGW 112 and SGW 110. If a currently used PGW 112 is farther away than another PGW 112 that is available to the UE 102, the optimization component 406 may determine that the PDN connection can be optimized. In one embodiment, the optimization component 406 determines whether a current PDN connection can be optimized in response to mobility of the UE 102. For example, if communication for the UE 102 relocates to a new SGW 110, the optimization component 406 may determine whether the current PDN connection can be optimized. In one embodiment, the optimization component 406 may determine a new PGW 112 while maintaining the same SGW 110 on which the UE 102 is currently connected.

Figure 5:
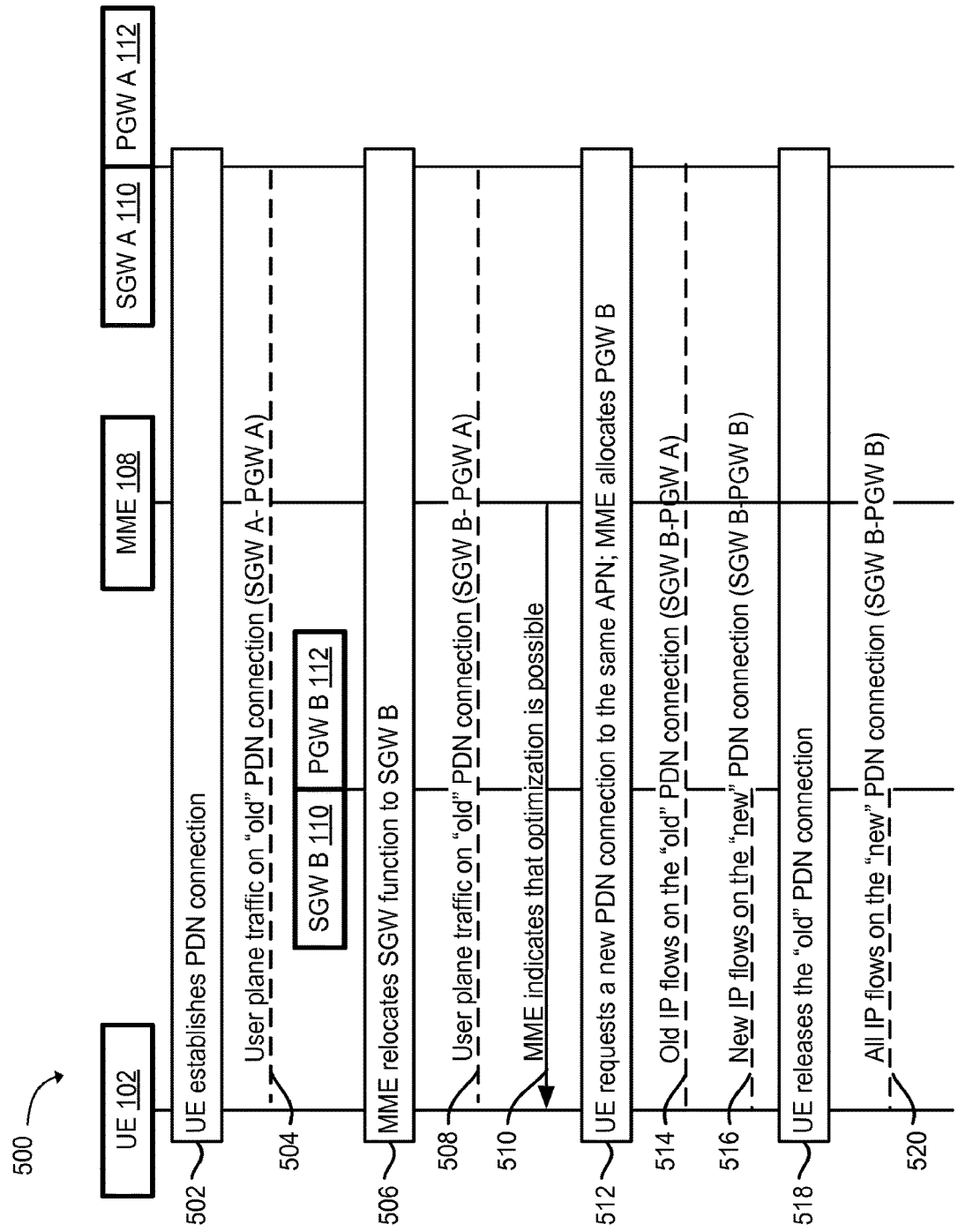
FIG. 5 is a diagram of a communication timeline illustrating communication between a UE and network infrastructure to offload traffic flows without service disruption consistent with embodiments disclosed herein.
Figure 6A:
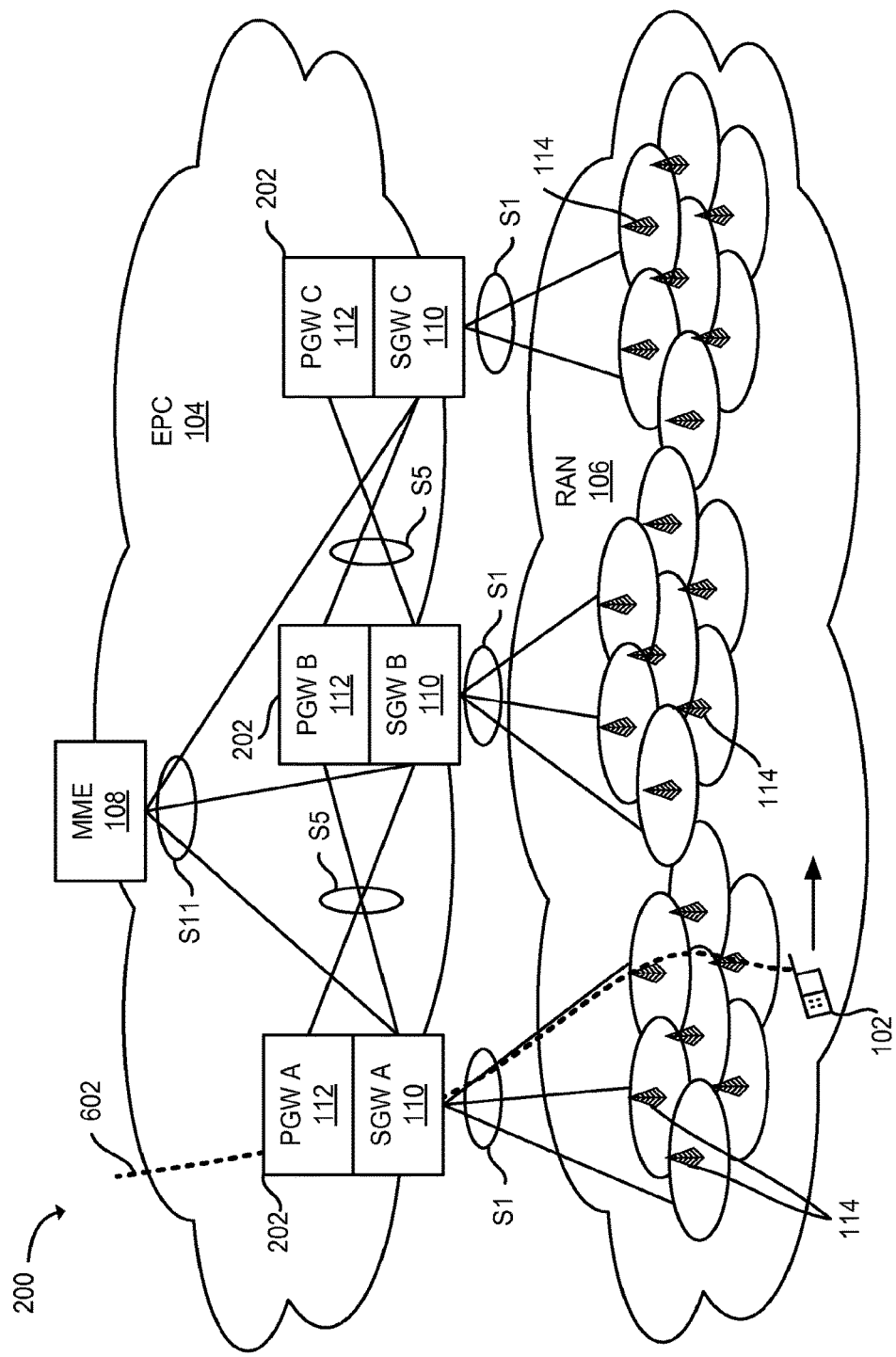
FIGS. 6A, 6B, and 6C are schematic diagrams illustrating offloading traffic flows within a communication system consistent with embodiments disclosed herein.
Figure 6B:
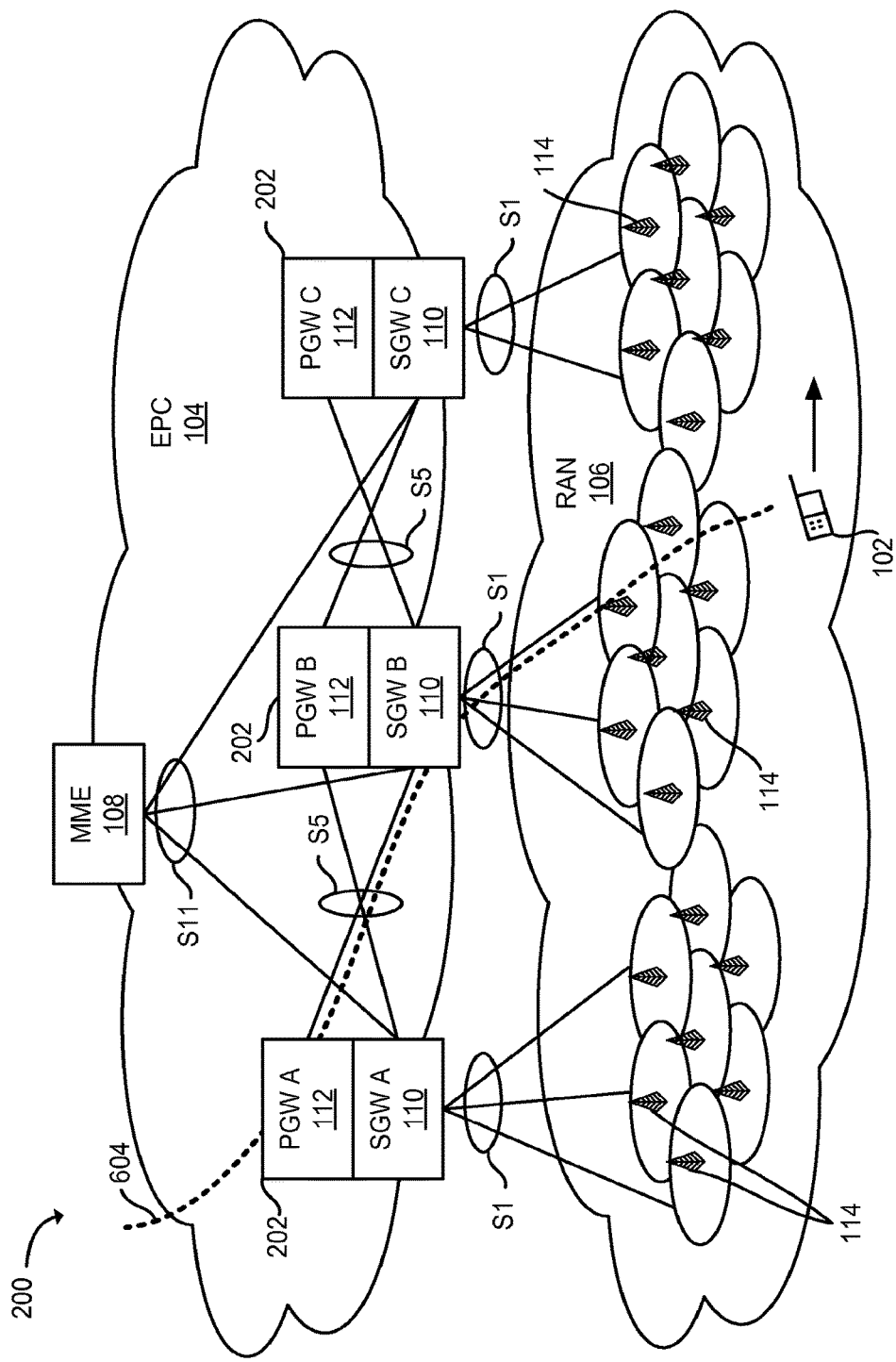
Figure 6C:
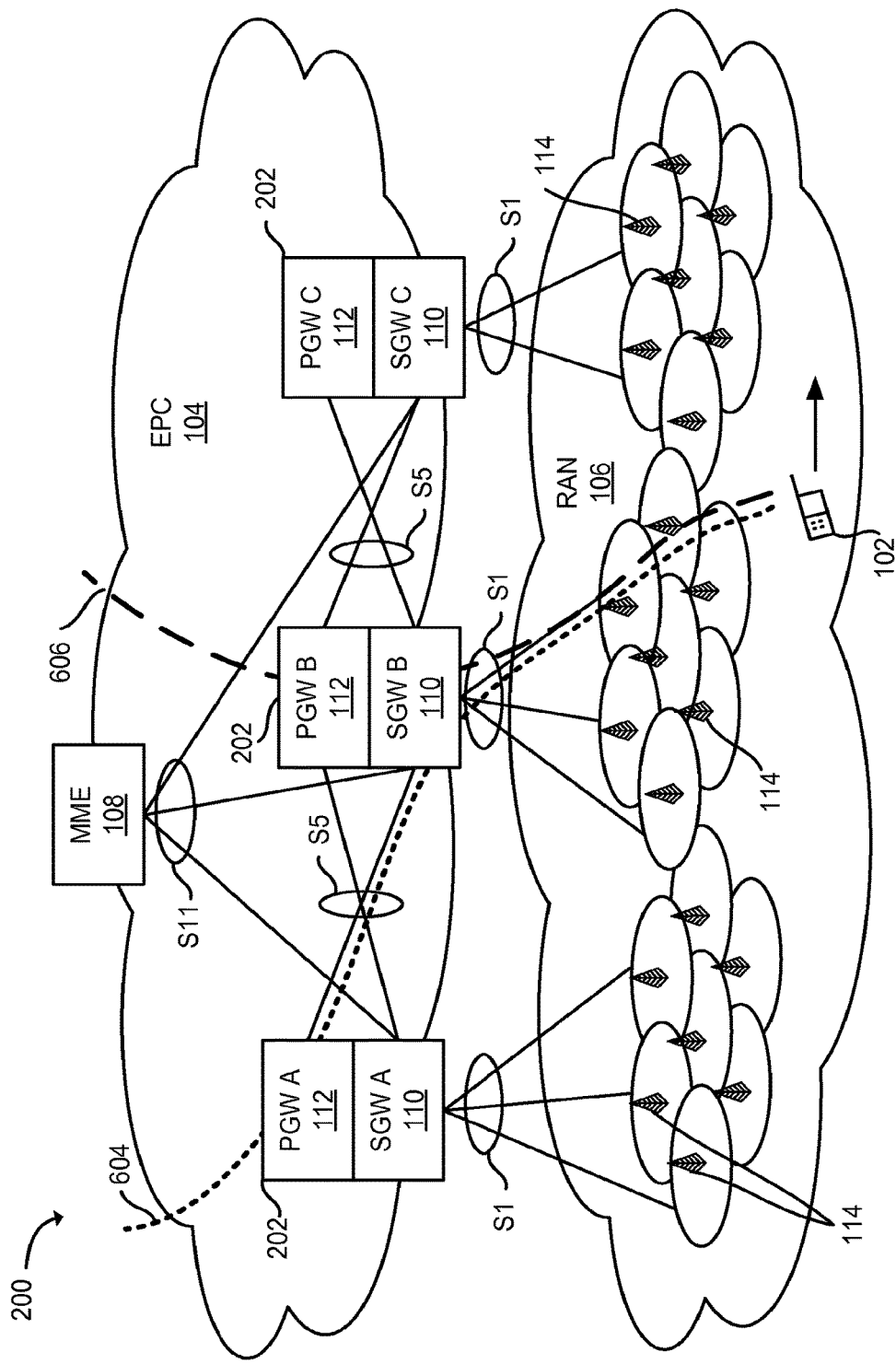

FIG. 5 is a schematic diagram of a communication time line 500 illustrating communication between the UE 102 and network infrastructure to offload traffic flows without service disruption. FIGS. 6A, 6B, and 6C will be discussed in relation to the communication timeline 500 of FIG. 5 to illustrate soft SIPTO operation.

The UE 102 establishes 502 a PDN connection. In one embodiment, the connection component 304 establishes 502 the connection by requesting connection to a specific APN. The MME 108, in response to the request, assigns an SGW 110 and PGW 112 to the UE 102 for the PDN connection. The UE 102 is assigned an IP address (IP@1) with the assigned PGW 112. The MME 108 may select the SGW 110 and/or the PGW 112 based on the geographic location of the UE 102. Following establishment 502 of the PDN connection, the user plane traffic for the UE 102 is directed 504 over the selected SGW 110 and PGW 112. FIG. 6A illustrates a UE 102 connected to a communication network with the PDN connection 602 directed over SGW A 110 and PGW A 112.

Also depicted in FIG. 6A is the movement of the UE 102 with respect to the RAN 106. As the UE 102 moves with respect to the RAN 106, the UE 102 may require connection to an eNB 114 outside of an original cluster. In response to the UE 102 mobility, the MME 108 relocates 506 the SGW function to a different SGW 110. FIG. 6B illustrates the UE 102 having moved to a new location covered by SGW B 110 instead of SGW A 110. Following SGW relocation 506 by the MME 108, the user plane traffic for the UE 102 is directed 508 over SGW B 110 and the same PGW 112, specifically PGW A 112. FIG. 6B illustrates the updated PDN connection 604 over SGW B 110 and PGW A 112. Because the UE 102 still uses PGW A 112 for the PDN connection, the UE 102 maintains the same IP address (IP@1).

The MME 108 indicates 510 to the UE 102 that optimization is possible. The MME 108 may provide the indication after a determination that a geographically closer PGW 112 is available for usage by the UE 102. For example, the MME 108 may determine that PGW B 112 is closer to the UE 102 and/or SGW A 110. The MME 108 may determine that data for the UE 102 may be more efficiently backhauled over PGW B 112. The UE 102 may receive the indication that optimization is available within an NAS message. In one embodiment, the MME 108 only indicates 510 that optimization is possible if the UE 102 has indicated that it is capable of soft SIPTO.

The UE 102 requests 512 a new PDN connection, in response to the indication that optimization is available. The request 512 for the new PDN connection includes a request for the same service type as the old PDN connection (such as updated PDN connection 604). In one embodiment, the request 512 for the PDN connection may include the same APN or a different APN that corresponds to the same service type. The UE 102 maintains the old PDN connection 604 even while requesting 512 the new PDN connection. The MME 108 receives the request 512 and allocates a new PGW 112 for the new PDN connection. In one embodiment, the MME 108 allocates the PGW 112 that was identified as geographically close. For example, the MME 108 allocates PGW B 112 of FIGS. 6A-6C. FIG. 6C illustrates the old PDN connection 604 and the new PDN connection 606. Because the new PDN connection 606 is hosted on PGW B 112, the UE 102 is assigned a new IP address (IP@2) for the new PDN connection 606.

Following allocation of the new PDN connection 606, old traffic flows continue to be directed 514 over the old PDN connection (specifically SGW B 110 and PGW A 112) using the old IP address (IP@1) and new traffic flows are directed 516 over the new PDN connection (specifically SGW B 110 and PGW B 112 using the new IP address (IP@2)). The old traffic flows may include any traffic flows that existed prior to establishment of the new PDN connection 606 and new traffic flows may include traffic flows that are begun after establishment of the new PDN connection 606. FIG. 6C illustrates the old PDN connection 604 and the new PDN connection 606. During this time period, the UE 102 has active traffic flows, and IP addresses, corresponding to both PGW A 112 and PGW B 112.

After establishment of the new PDN connection 606, the UE 102 may begin to transfer old traffic flows from the old IP address (IP@1) to the new PDN connection 606 using the new IP address (IP@2). For example, the UE 102 may use SIP mobility messaging to transfer an active flow to the new IP address. This may allow for more efficient use of the old traffic flows while maintaining continuity of service. Over time, the number of old traffic flows may be reduced until there are no more active traffic flows over the old PDN connection 604. The old traffic flows may be reduced, for example, simply because a file has been downloaded, a music stream has ended, a video stream has ended, and/or the active downloads have all been transferred to the new PDN connection 606.

The UE 102 releases 518 the old PDN connection 604. The UE 102 may release 518 the old PDN connection 604 when all the old traffic flows have either ended or been transferred to the new PDN connection 606. The UE 102 may release 518 the old PDN connection 604 by sending a message indicating release of the PDN connection 604 or the PGW A 112. Following release of the old PDN connection 604, all traffic flows for the UE 102 are routed 520 over the new PDN connection 606.

Further movement of the UE 102 may necessitate repetition of the communication of FIG. 5. For example, if the UE 102 continues to move into a cluster corresponding to SGW C 110, a similar process may be repeated to establish a PDN connection over SGW C 110 and/or PGW C 112.

Although the example operation of offloading only illustrated two active PDN connections corresponding to the same service type, three or more active PDN connections corresponding to the same service type may also be possible, or desirable in some circumstances. For example, if the SGW function for the UE 102 is relocated to SGW C 110 before the old flows are transferred or expire, the UE 102 may maintain three active PDN connections. In another embodiment, a hard SIPTO or release of the old PDN connection may occur if the UE 102 is relocated to a third SGW 110, such as SGW C 110.

One aspect of wireless networks includes the tracking of data services provided to a specific individual or UE 102. For example, 3GPP defines an aggregate maximum bit rate (AMBR) for a specific UE 102 or individual. The AMBR may be tracked at multiple levels within the system and multiple types of AMBR may be tracked. For example, the UE-AMBR is an AMBR for all communication services provided to the specific UE 102 while the APN-AMBR is an AMBR for communications corresponding to a specific APN or service type. In 3GPP, the UE-AMBR is enforced at the eNB 114 level or SGW level while the APN-AMBR is enforced at the PGW level. Because the present disclosure allows the UE 102 to connect to multiple PGWs 112, the APN-AMBR enforcement at the PGW level may no longer be accurate. Thus, modifications to tracking and/or enforcement of the APN-AMBR may be necessary.

In one embodiment, tracking and enforcement of the APN-AMBR may be moved closer to the UE 102 so that multiple PDN connections will still be routed through an entity that enforces the APN-AMBR. For example, the APN-AMBR enforcement may be moved to an SGW 110. Enforcement of the APN-AMBR at the SGW level may require modification to the S11 interface so that the SGW 110 is aware of the APN-AMBR value for a specific UE 102. For example, the MME 108 may communicate the APN-AMBR to the SGW 110 using an existing or newly defined message of the S11 interface. In one embodiment, enforcement of the APN-AMBR may be performed at the eNB 114. Enforcement of the APN-AMBR at the eNB level may require modification to the S11 interface and/or the S1-MME interface so that the eNB 114 is aware of the APN-AMBR value for a specific UE 102. One or more new or existing messages may be used to communicate the necessary information to the eNB 114.

In one embodiment, the APN-AMBR may not be tracked or enforced. For example, a UE-AMBR may be enforced with respect to the UE 102 but no additional data limits or AMBRs with respect to specific APNs or service types may be imposed.

FIG. 7 is a schematic flow chart diagram illustrating a method 700 for offloading traffic flows without service disruptions. The method 700 may be performed by a UE 102 or other mobile communication device.

The method 700 begins and the UE 102 receives 702 an indication that a current PDN connection can be optimized. The UE 102 may receive 702 the message from the MME 108 in the form of NAS messaging. In one embodiment, the current PDN connection may include a connection to a specific service type over a first PGW 112.

The UE 102 requests 704 a new PDN connection. The request 704 may indicate a service type that is the same as an existing PDN connection. In one embodiment, the UE 102 may request 704 the new PDN connection with a message that includes the same APN used to establish the current PDN connection. The MME 108 may allocate the new PDN connection over a second PGW 112.

The UE 102 routes 706 old traffic over the current PDN connection and new traffic over the new PDN connection. For example, the UE 102 may route 706 old traffic over a first PGW 112 corresponding to the current PDN connection and route 706 new traffic over a second PGW 112 corresponding to the new PDN connection.

FIG. 8 is a schematic flow chart diagram illustrating another method 800 for offloading traffic flows without service disruptions. The method 800 may be performed by a UE 102 or other mobile communication device.

The method 800 begins and the capability component 306 sends 802 an indication that the UE 102 is capable of soft SIPTO. The connection component 304 establishes 804 a second PDN connection in addition to a first PDN connection. For example, the trigger for establishing the second PDN connection may be due to the UE 102 receiving a message from an MME 108 indicating optimization is possible which may be due to movement of the UE 102. The second PDN connection may include a connection with a second PGW 112. The first PDN connection may include a connection with the first PGW 112.

The soft SIPTO component 308 sends 806 old traffic flows over a first PGW 112 and new traffic flows over a second PGW 112. For example, the old traffic flows may include traffic flows that were established on an old IP address corresponding to the first PGW 112. The new traffic flows may be started after establishment of the new PDN connection (second PGW 112) and may thus be established on a new IP address corresponding to the second PGW 112.

Figure 9:
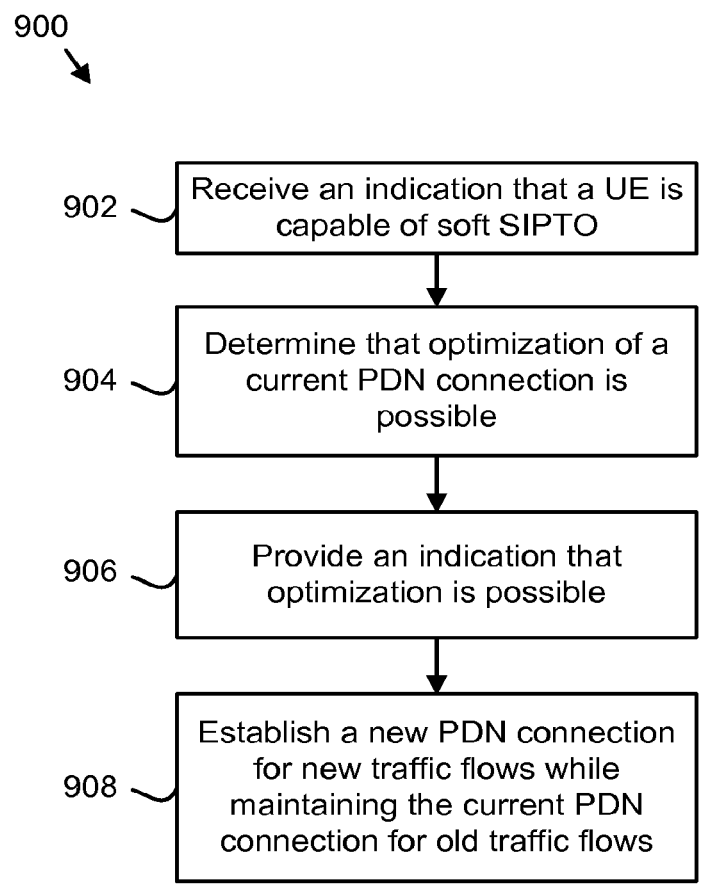
FIG. 9 is a schematic flow chart diagram illustrating yet another method for offloading of traffic flows consistent with embodiments disclosed herein.

FIG. 9 is a schematic flow chart diagram illustrating a method 900 for offloading traffic flows without service disruptions. The method 900 may be performed by an MME 108 or other network infrastructure component.

The method 900 begins and a capability component 404 receives 902 an indication that a UE 102 is capable of soft SIPTO. An optimization component 406 determines 904 that optimization of a current PDN connection for the UE 102 is possible. The optimization component 406 may determine 904 the optimization of the current PDN connection is possible based on a geographic location of the UE 102 and/or one or more network components. For example, the optimization component 406 may determine 904 that a PGW 112 of the current PDN connection is geographically distant from the UE 102 while another PGW 112 is geographically closer. Based on the proximity of an available PGW 112, the optimization component 406 may determine 904 that optimization of the current PDN connection is possible.

The MME 108 provides 906 an indication to the UE 102 that optimization is possible. For example, the MME 108 may provide 906 an indication that soft SIPTO to improve the PDN connection may be performed.

A connection component 402 establishes 908 a new PDN connection while maintaining the current PDN connection. The MME 108 may select a PGW 112 for the new PDN connection that more efficiently uses network resources and/or improves data through-put or reduces latency at the UE 102. The UE 102 may then route new traffic flows over the new PDN connection while routing old traffic flows over the current or old PDN connection.

Figure 10:
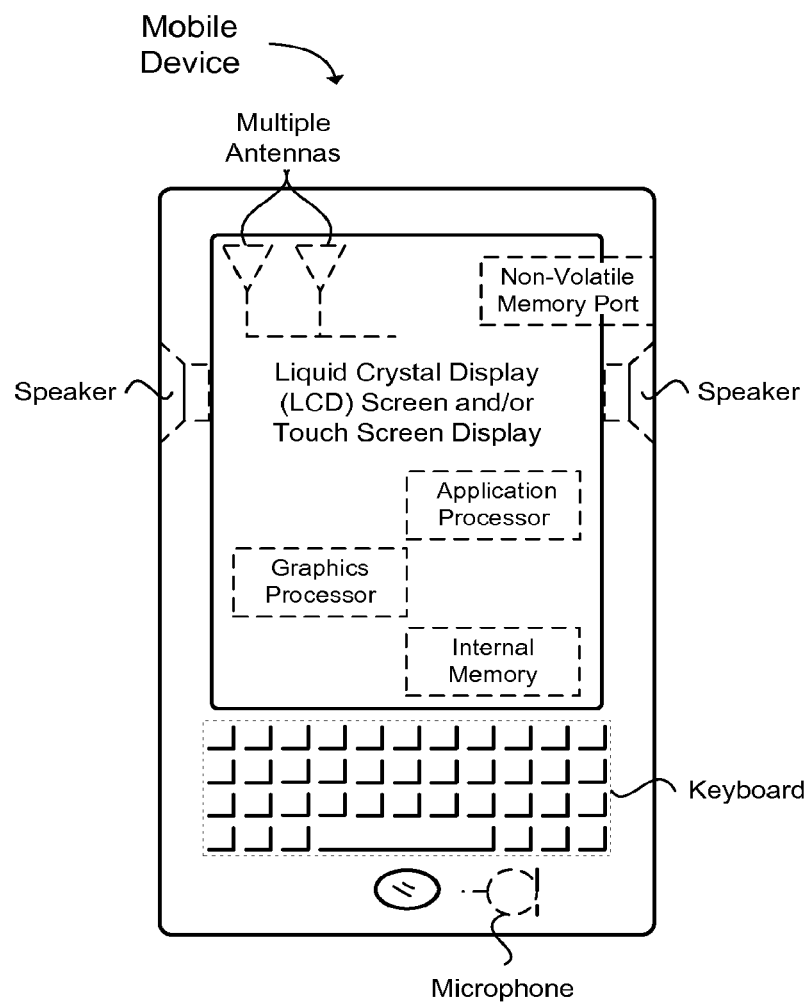
FIG. 10 is a schematic diagram of a mobile device consistent with embodiments disclosed herein.

FIG. 10 is an example illustration of a mobile device, such as a UE, a mobile station (MS), a mobile wireless device, a mobile communication device, a tablet, a handset, or another type of mobile wireless device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 10 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments.

Example 1 is a UE that includes a capability component, a connection component, and a soft SIPTO component. The capability component is configured to send an indication that the mobile communication device is capable of soft SIPTO. Soft SIPTO includes maintaining a plurality of PDN connections for a same communication service type. The connection component is configured to, in response to an indication from the network, establish a second PDN connection in addition to a first PDN connection for a same communication service type. The soft SIPTO component is configured to, in response to establishing the second PDN connection, send old traffic over a first PDN connection and new traffic over a second PDN connection. The first PDN connection and the second PDN connection correspond to the same communication service type.

In Example 2, the soft SIPTO component of Example 1 can be optionally further configured to release the first PDN connection in response to expiration of the old traffic.

In Example 3, the soft SIPTO component of Examples 1-2 can be optionally further configured to receive NAS messaging indicating that the current PDN connection is less optimal than an available PDN connection. The UE can optionally trigger a second PDN connection establishment for the same communication service type in response to receiving the NAS messaging.

In Example 4, the UE of Examples 1-3 can optionally be assigned a first IP address on the first PDN connection and assigned a second IP address on the second PDN connection.

In Example 5, the connection component of Examples 1-4 can optionally establish the second PDN by requesting connection to the same communication service type using the same APN.

In Example 6, the connection component of Examples 1-5 can optionally establish the second PDN by requesting connection to the same communication service type using a different APN that corresponds to the same communication service type.

In Example 7, the UE of Examples 1-6 can optionally include one or more antennas, display screens, and/or physical input keys.

Example 8 is a mobile communication device configured to receive an indication that a current PDN connection is not optimal. The current PDN connections is established over a first communication node. The mobile communication device is configured to request a new PDN connection for the same communication service type without releasing the connection over the first communication node. The mobile communication device is configured to route new traffic flows over a second communication node corresponding to the new PDN connection and route old traffic flows over the first communication node.

In Example 9, the requesting connection to the same communication service type In Example 8 can optionally include requesting using the same APN.

In Example 10, requesting connection over the new PDN connection of Example 8-9 can optionally include requesting using a APN that corresponds to the same communication service type.

In Example 11, the mobile communication device of Examples 8-10 can be optionally further configured to release the connection over the first communication node in response to expiration of the old traffic flows.

In Example 12, expiration of the old traffic flows in Example 11 can optionally include one or more of an end of a file download, an end to a music stream, and an end to a video stream.

In Example 13, expiration of the old traffic flows in Example 11 can optionally include a transfer of the old traffic flows to the second PDN connection.

In Example 14, transfer of the old traffic flows in Example 13 can optionally include transferring the old traffic flows using SIP mobility procedures.

Example 15 is an MME that is configured to receive an indication that a UE is capable of soft selected IP traffic offload. The MME is configured to, in response to mobility of the UE, determine that optimization of a current packet data network connection is possible. The MME is configured to provide an indication to the UE that improvement of the current packet data network connection is available. The MME is configured to establish, for the UE, a new packet data network connection for the same communication service type for new traffic flows while maintaining the current packet data network connection for old traffic flows.

In Example 16, the MME of Example 15 can optionally establish the new packet data network connection in response to a request from the UE for a connection to the same communication service type.

In Example 17, the new packet data network connection of Examples 15-16 can optionally include a connection through a PGW located proximally to a network edge.

In Example 18, the PGW of Example 17 can be optionally co-located with a SGW.

In Example 19, the PGW of Example 17 can be optionally co-located with an eNB.

In Example 20, the current packet data network connection of Examples 15-19 can optionally include a connection over a first PGW and the new packet data network connection for the same communication service type can optionally include a connection over a second PGW.

In Example 21, the MME of Examples 15-20 can be optionally located in a network that does not enforce an APN-AMBR.

In Example 22, the MME of Examples 15-21 can be optionally located in a network where an APN-AMBR is enforced at one of an SGW and an eNB.

Example 23 is a UE comprising circuitry configured to, in response to an indication from the network, request establishment of a new packet data network (PDN) connection for new traffic flows while maintaining an old packet data network connection for old active traffic flows. The new packet data network connection and the old packet data network connection both correspond to the same communication service type.

In Example 24, the UE of Example 23 can be optionally further configured to transfer old active traffic flows to the new packet data network connection.

Example 25 is a method for mobile communication device mobility. The method includes sending an indication that the mobile communication device is capable of soft SIPTO, wherein soft SIPTO comprises maintaining a plurality of PDN connections for a same communication service type. The method includes, in response to an indication from the network, establishing a second PDN connection in addition to a first PDN connection for a same communication service type. The method includes, in response to establishing the second PDN connection, sending old traffic over a first PDN connection and new traffic over a second PDN connection, wherein the first PDN connection and the second PDN connection correspond to the same communication service type.

In Example 26, the method of Example 25 can optionally further include releasing the first PDN connection in response to expiration of the old traffic.

In Example 27, the method of Examples 25-26 can optionally further include receiving NAS messaging indicating that the current PDN connection is less optimal and triggering a second PDN connection establishment for the same communication service type in response to receiving the NAS messaging.

In Example 28, the mobile communication device of Examples 25-27 can optionally be assigned a first IP address on the first PDN connection and assigned a second IP address on the second PDN connection.

In Example 29, establishing the second PDN connection in the method of Examples 25-28 can optionally include requesting connection to the same communication service type using the same APN.

In Example 30, establishing the second PDN connection in the method of Examples 25-30 can optionally include requesting connection to the same communication service type using a different APN that corresponds to the same communication service type.

In Example 31, the mobile communication device of Examples 25-30 can optionally include one or more of an antenna, a display screen, and a physical input key.

Example 32 is a method for mobile communication device mobility that includes receiving an indication that a current PDN connection is not optimal. The current PDN connection is established over a first communication node. The method includes requesting a new PDN connection for the same communication service type without releasing the connection over the first communication node. The method includes routing new traffic flows over a second communication node corresponding to the new PDN connection and route old traffic flows over the first communication node.

In Example 33, requesting a new PDN connection for the same communication service type in Example 32 can optionally include requesting using the same APN.

In Example 34, requesting a new PDN connection for the same communication service type in Example 32-33 can optionally include requesting using a different APN that corresponds to the same communication service type.

In Example 35, the method of Examples 32-34 can optionally further include releasing the connection over the first communication node in response to expiration of the old traffic flows.

In Example 36, the expiration of the old traffic flows in Example 35 can optionally include one or more of an end of a file download, an end to a music stream, and an end to a video stream.

In Example 37, the expiration of the old traffic flows in Example 35 can optionally include a transfer of the old traffic flows to the second PDN connection.

In Example 38, transfer of the old traffic flows in Example 37 can optionally include transferring the old traffic flows using SIP mobility procedures.

Example 39 is a method for UE mobility. The method includes receiving an indication that the UE is capable of soft selected IP traffic offload. The method includes, in response to mobility of the UE, determining that optimization of a current packet data network connection is possible. The method includes, providing an indication to the UE that improvement of the current packet data network connection is available. The method includes establishing, for the UE, a new packet data network connection for the same communication service type for new traffic flows while maintaining the current packet data network connection for old traffic flows.

In Example 40, establishing the new packet data network connection in Example 39 can optionally be performed in response to a request from the UE for a connection to the same communication service type.

In Example 41, the new packet data network connection of Examples 39-40 can optionally include a connection through a PGW located proximally to a network edge.

In Example 42, the PGW of Example 41 can be optionally co-located with an SGW.

In Example 43, the PGW of Example 41 can be optionally co-located with an eNB.

In Example 44, the current packet data network connection of Examples 39-43 can optionally include a connection over a first PGW and the new packet data network connection for the same communication service type can optionally include a connection over a second PGW.

Example 44 is an apparatus that includes means to perform a method in any of Examples 25-44.

Example 45 is a machine readable storage including machine-readable instructions that, when executed, implement a method or realize an apparatus of Examples 25-44.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, procedure, or function. Nevertheless, the executables of an identified component need not be physically located together, but may comprise disparate instructions stored in different locations which, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. An apparatus for a user equipment (UE), the apparatus comprising:
a memory to store first data associated with a first non-access stratum (NAS) message provided by a mobility management function of a network, the first NAS message to indicate a request for user plane connection relocation by release of a first user plane connection to the network after establishment of a second user plane connection to the network; and
circuitry configured to:
process the first data associated with the first NAS message to decide whether to initiate a procedure for establishment of the second user plane connection;
in response to the initiation of the procedure, generate second data associate with a second NAS message for the mobility management function, the second NAS message to request establishment of the second user plane connection;
generate both new traffic flows over the second user plane connection and old traffic flows over the first user plane connection; and
generate third data associated with a third NAS message for the mobility management function, the third NAS message to request release of the first user plane connection.

2. The apparatus of claim 1, in which the circuitry is further configured to generate the third data in response to consolidation of traffic via the second user plane connection.

3. The apparatus of claim 1, in which the circuitry is further configured to generate the third data in response to the first user plane connection being no longer needed.

4. The apparatus of claim 1, in which the circuitry is further configured to generate the third data in response to expiration of an event associated with the first user plane connection.

5. The apparatus of claim 1, the new traffic flows over the second user plane connection being different from the old traffic flows over the first user plane connection.

6. The apparatus of claim 1, in which the second user plane connection includes a new internet protocol (IP) address that is different from an old IP address of the first user plane connection.

7. A computer readable medium to store instructions that, when executed by a processor of a user equipment (UE), cause the UE to:
receive a first non-access stratum (NAS) message provided by a mobility management function of a network, the first NAS message to indicate a request for user plane connection relocation by release of a first user plane connection to the network after establishment of a second user plane connection to the network;
transmit a second NAS message for the mobility management function, the second NAS message to request establishment of the second user plane connection;
generate both new traffic flows over the second user plane connection and old traffic flows over the first user plane connection; and
transmit a third NAS message for the mobility management function, the third NAS message to request release of the first user plane connection.

8. The computer readable medium of claim 7, in which the instructions further cause the UE to generate the third NAS message in response to consolidation of traffic via the second user plane connection.

9. The computer readable medium of claim 7, in which the instructions further cause the UE to generate the third NAS message in response to the first user plane connection being no longer needed.

10. The computer readable medium of claim 7, in which the instructions further cause the UE to generate the third NAS message in response to expiration of an event associated with the first user plane connection.

11. The computer readable medium of claim 7, the new traffic flows over the second user plane connection being different from the old traffic flows over the first user plane connection.

12. The computer readable medium of claim 7, in which the second user plane connection includes a new internet protocol (IP) address that is different from an old IP address of the first user plane connection.

13. A network node for a network, the network node configured to provide mobility management for a user equipment (UE) wirelessly connectable to the network, the network node comprising:
a memory to store for the UE information regarding a point of attachment to the network; and
circuitry configured to:
process the information to determine whether a user plane connection of the UE needs to be relocated; and
generate a message to indicate a request for the user plane connection to be relocated by release of a first user plane connection to the network and termination of first traffic flows over the first user plane connection after establishment of a second user plane connection to the network and establishment of second traffic flows over the second user plane connection.

14. The network node of claim 13, in which the message is a non-access stratum (NAS) message.

15. The network node of claim 13, in which the message is generated for the UE.

16. The network node of claim 13, further comprising a mobility management function.

17. The network node of claim 13, in which the information regarding the point of attachment to the network is based on a geographic location of the UE.

18. A computer readable medium for a network node, the computer readable medium including instructions that, when executed by a processor, cause the processor to:
process information to determine whether a user plane connection of a user equipment (UE) needs to be relocated within a network including the network node; and
generate a message to indicate a request for the user plane connection to be relocated by release of a first user plane connection to the network and termination of first traffic flows over the first user plane connection after establishment of a second user plane connection to the network and establishment of second traffic flows over the second user plane connection.

19. The computer readable medium of claim 18, in which the message is a non-access stratum (NAS) message.

20. The computer readable medium of claim 18, in which the message is generated for the UE.

21. The computer readable medium of claim 18, further comprising instructions for a mobility management function.

\* \* \* \* \*